Feb. 23, 1937.  W. F. FEYRER  2,071,972
PHONOGRAPH
Original Filed Dec. 31, 1928   5 Sheets-Sheet 2
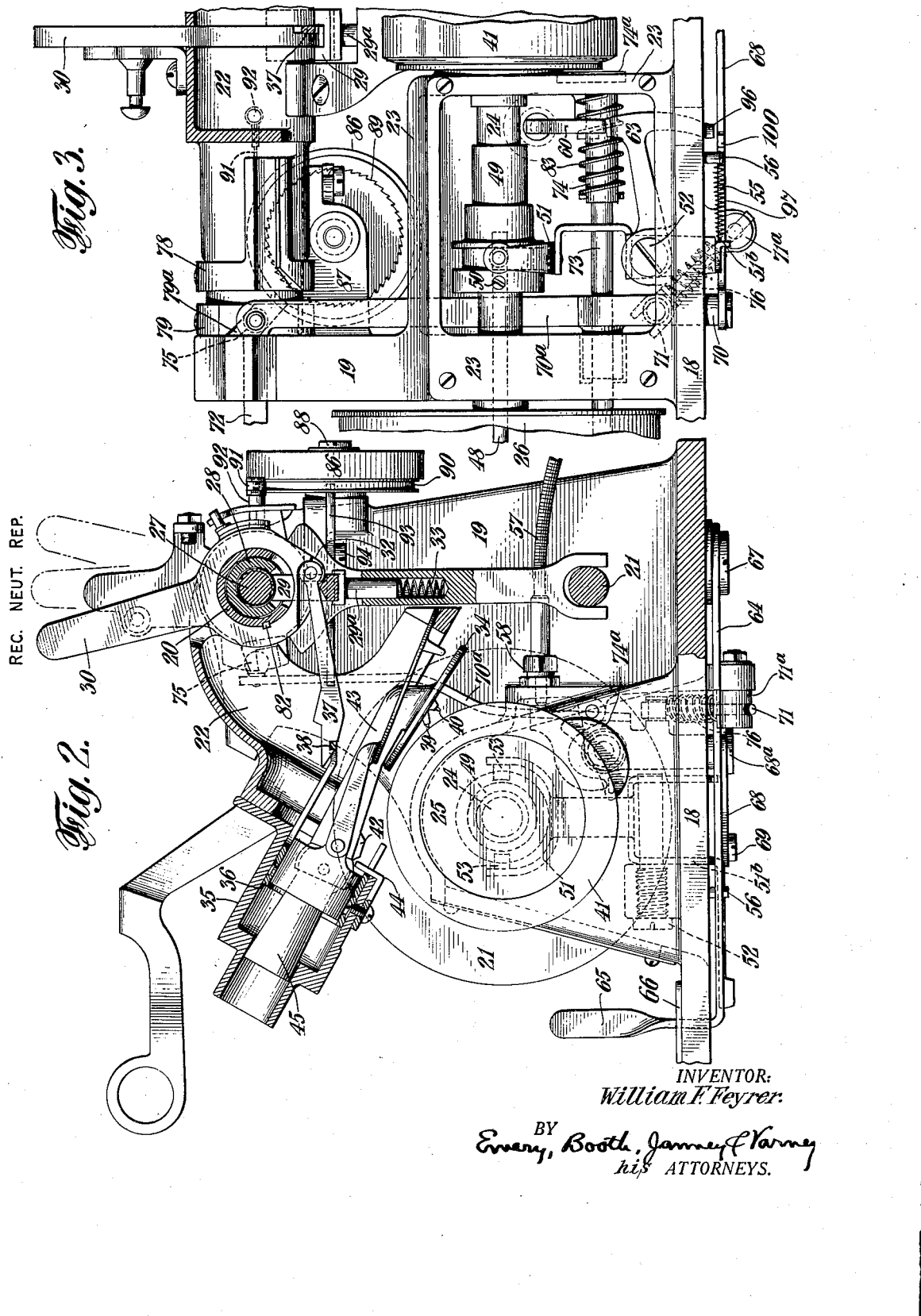
INVENTOR:
William F. Feyrer.
BY Emery, Booth, Janney & Varney
his ATTORNEYS.

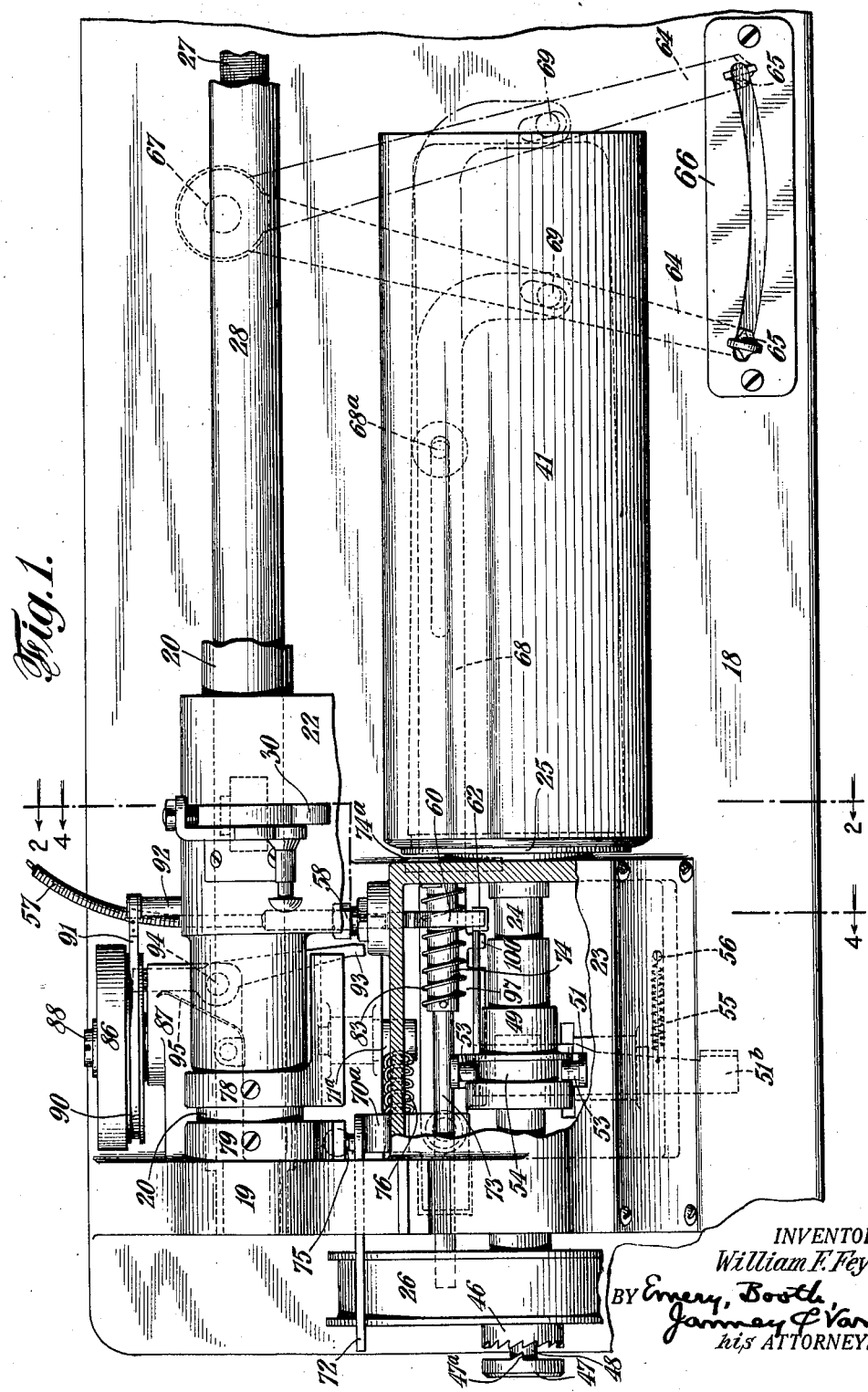

Feb. 23, 1937.   W. F. FEYRER   2,071,972
PHONOGRAPH
Original Filed Dec. 31, 1928   5 Sheets-Sheet 3
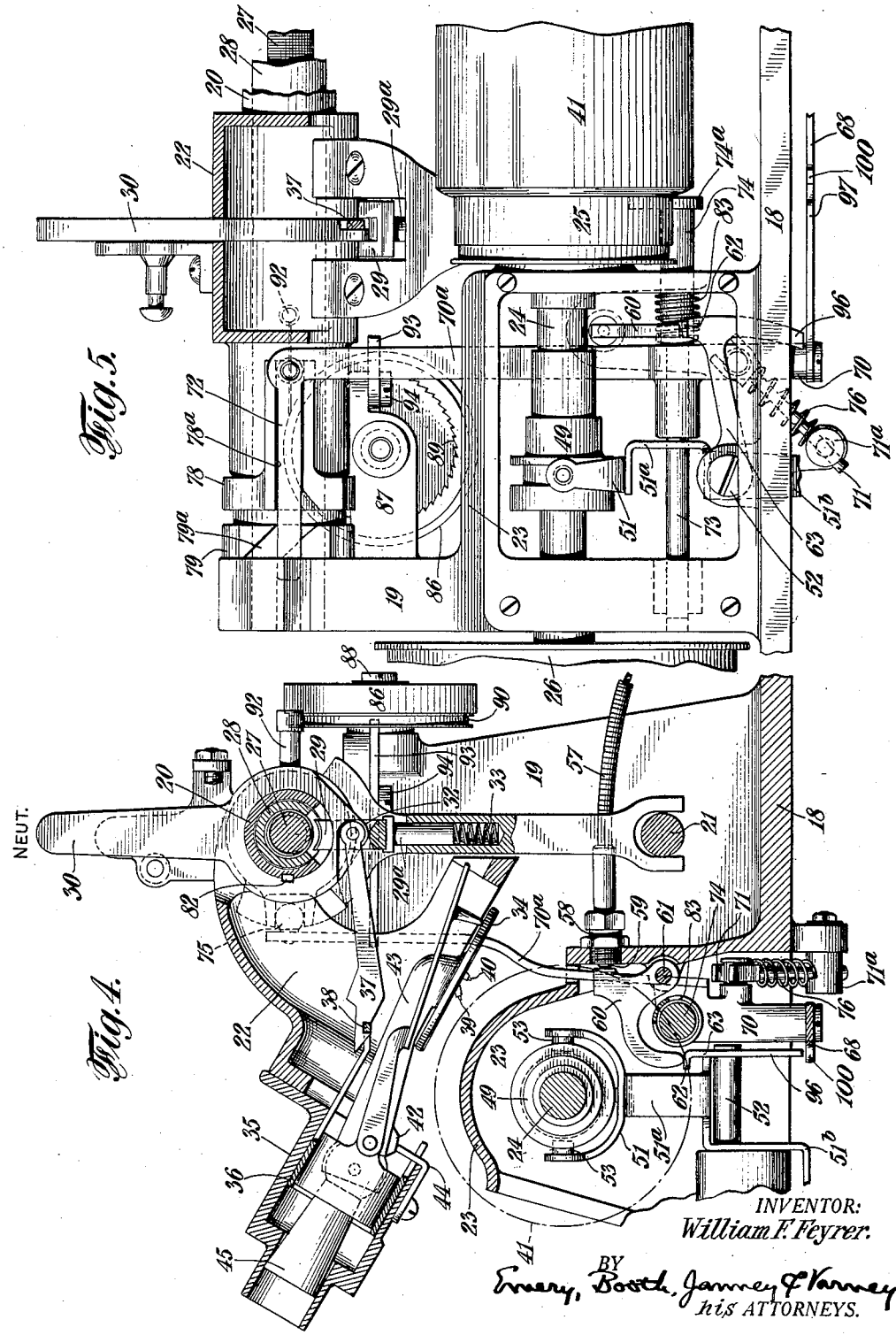
INVENTOR:
William F. Feyrer.
BY
Emery, Booth, Janney & Varney
his ATTORNEYS.

Feb. 23, 1937.      W. F. FEYRER      2,071,972
PHONOGRAPH
Original Filed Dec. 31, 1928    5 Sheets-Sheet 4
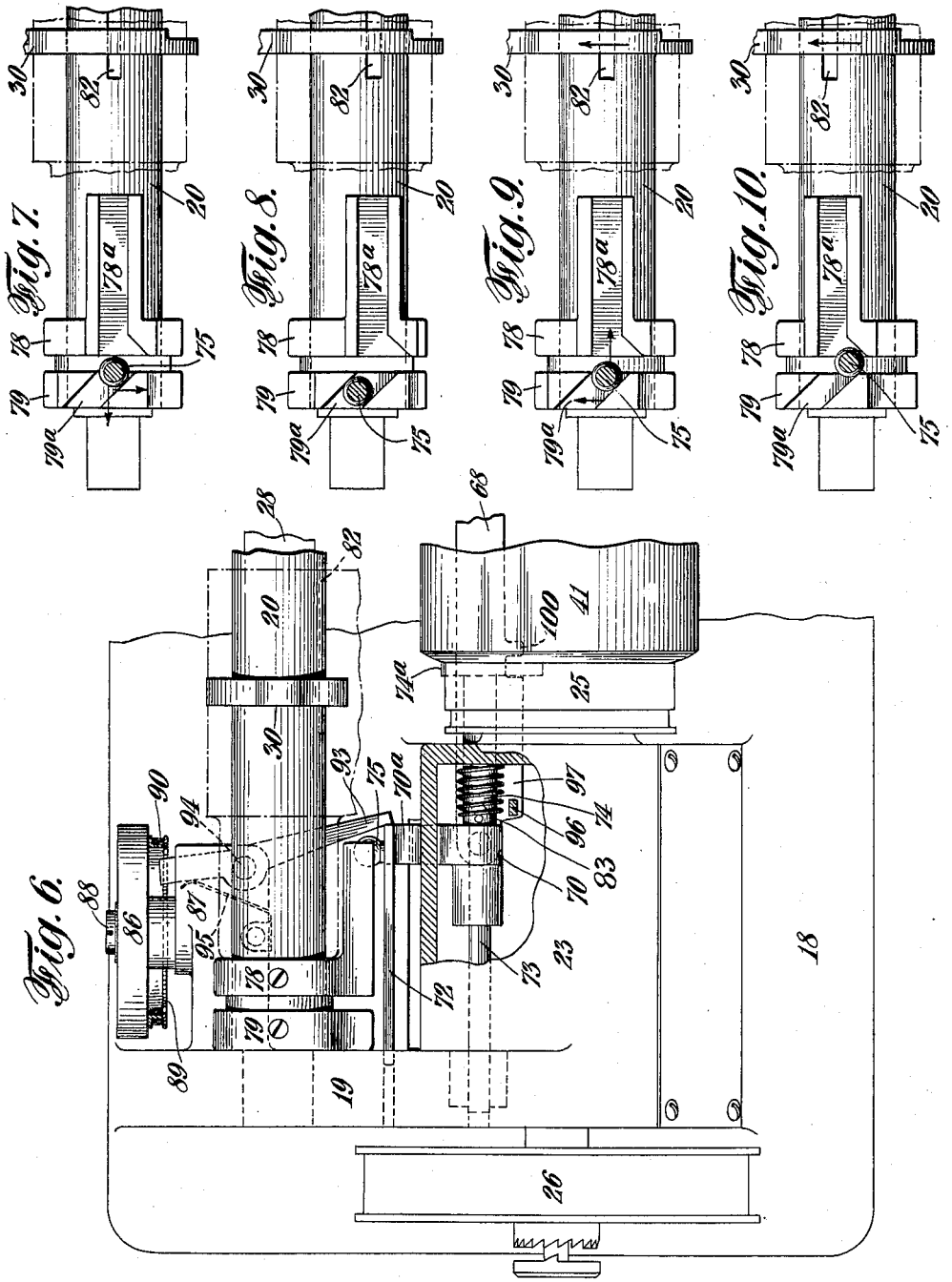
INVENTOR:
William F. Feyrer.
BY
Emery, Booth, Janney & Varney
his ATTORNEYS.

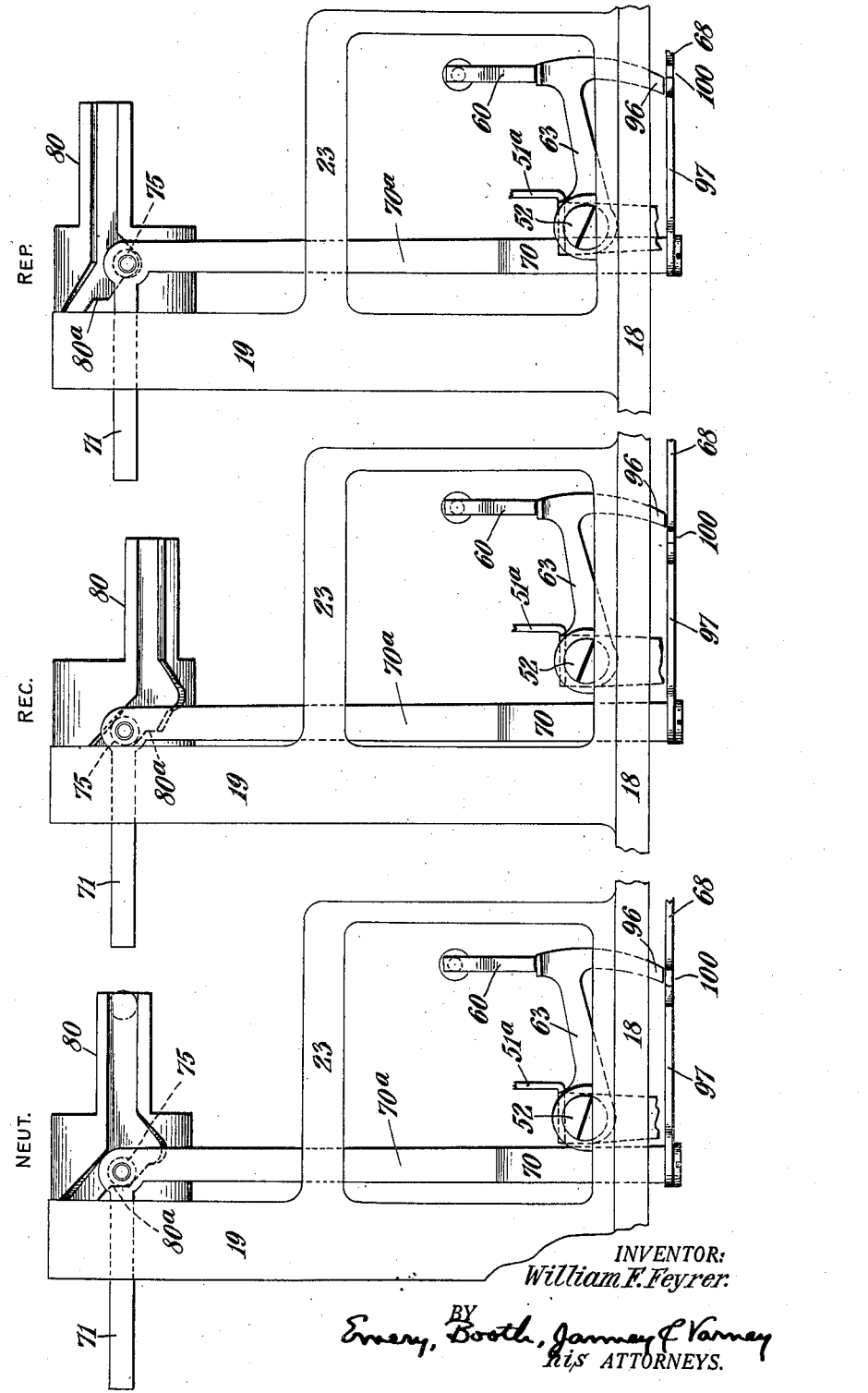

Patented Feb. 23, 1937

2,071,972

UNITED STATES PATENT OFFICE 2,071,972

PHONOGRAPH

William F. Feyrer, Bridgeport, Conn., assignor to Dictaphone Corporation, Bridgeport, Conn., a corporation of New York Application December 31, 1928, Serial No. 329,429
Renewed November 15, 1935

28 Claims. (Cl. 274—17)

This invention relates to phonographs, and more particularly to dictating machines using cylindrical sound record tablets.

It is an object of this invention to provide an improved phonograph and control means therefor.

Other objects and advantages of the invention will appear hereinafter.

In the accompanying drawings and description which disclose an embodiment of the invention selected for purposes of illustration:

Fig. 1 is a top plan view of a dictating machine with portions of the sound-box carriage and the framework broken away to disclose more clearly the invention;

Fig. 2 is a view partly in end elevation and partly in section, the elevation being taken from the right hand end of the machine, and the section being substantially on the line 2—2 of Fig. 1, the sound-box carriage being shown;

Fig. 3 is a front elevation of the left hand portion of the machine shown in Fig. 1, with the housing cover plate removed and with the carriage broken away as shown in Fig. 1;

Fig. 4 is a vertical section generally on the line 4—4 of Fig. 1, but with the sound-box carriage shown substantially on the line 2—2 of Fig. 1, and with a portion of the mechanism in different operating position from that shown in Fig. 2;

Fig. 5 is a view generally similar to Fig. 3, but showing a portion of the mechanism in different operative position;

Fig. 6 is a diagrammatic top plan view similar to Fig. 1, but with parts of the mechanism removed and broken away, and with other parts in different operative position;

Figs. 7 to 10 inclusive show in more detail the mechanism for controlling the sound-box and styli, the different figures showing steps in the operation of the stylus; and Figs. 11 to 13 inclusive show a modified form of mechanism for controlling the sound-box and styli.

The specific embodiment of the invention selected for purposes of illustration has means associated with the record ejector for moving the stylus control lever into neutral position, if the lever is in either recording or reproducing position, prior to movement of the record on the mandrel by the ejector. Means are provided for maintaining the record ejector in actuated or record ejected position until another record is positioned on the mandrel, or until the ejector is manually reset. The stylus control lever is locked in neutral position during the time that the record ejector is in actuated position, and means may be provided for moving the stylus control lever to recording position after the ejector is returned to its non-actuated position. The stylus carriage is automatically returned to its initial position when the record ejector is actuated. Means associated with the stop-and-start control prevent actuation of this control to start the record mandrel rotating except when a stylus is in record-engaging position. Other features of the specific embodiment illustrated will become apparent as the description proceeds.

Referring to Fig. 1, a base plate 18 is provided near its left hand end with an upwardly projecting standard 19, and to the right of the standard 19 with a housing 23. The standard 19 and the housing 23 conveniently may be formed integral with each other and with the base plate 18.

The standard 19 and the right hand wall of the housing 23 have suitable bearings rotatably supporting a mandrel shaft 24 extending longitudinally above the base plate 18. The right hand end of the mandrel shaft carries a mandrel 25 adapted to receive a cylindrical record 41. The left hand portion of the mandrel shaft has a longitudinal axial bore.

Slidably mounted upon the mandrel shaft 24, within the housing 13, is a clutch collar 49. The clutch collar has a circumferential groove 54 which is engaged at substantially diametrically opposite points by two studs 53 carried, as may best be seen in Fig. 4, by a clutch operating yoke 51.

Referring to Fig. 3, it will be seen that the clutch collar 49 is connected by means of a pin 50, which passes through a longitudinal slot in the wall of the hollow portion of the mandrel shaft 24, with a rod 48 slidably mounted in the axial bore in the left hand end of the mandrel shaft. This arrangement permits simultaneous rotation of the mandrel shaft 24, the clutch collar 49, and the rod 48 as a unit, and at the same time provides for sliding movement of the clutch collar 49 and the rod 48 longitudinally of the mandrel shaft 24 under the influence of the clutch operating yoke 51.

As may best be seen in Fig. 1, the left hand end of the rod 48 extends beyond the left hand end of the mandrel shaft 24, and is provided with a clutch disc 47 having on its inner face a tooth or pawl 47a. When the rod 48 is moved to the right, the tooth 47a of the clutch disc will engage a ratchet face on the left hand end of a hub 46 which encircles the left hand end of the mandrel shaft 24 and forms a part of a pulley 26. The right hand end of the hub 46 is rotatably supported in a suitable bearing in the standard 19.

The pulley 26 is connected, as by means of a belt, (not shown) with any suitable driving means. When the rod 48 is moved to the left, which is its normal position, the pulley 26 is free to turn about the mandrel shaft 47 under the influence of its driving means. When the rod 48 is moved to the right by means of the clutch shifting yoke 51, in the manner hereinafter described, the tooth 47a of the clutch disc 47 engages the ratchet face of the pulley hub 46 to lock the pulley 26 and mandrel shaft 24 together. When the clutch members are locked together in this manner the mandrel shaft 24 and the mandrel 25 will rotate with the pulley 26.

Referring first to Figs. 4 and 5, and then to Fig. 1, the clutch shifting yoke 51 is secured, as at its lowermost point, to the upper end of a lever 51a which is pivotally mounted on a horizontal pin 52 carried by the base plate 18 within the housing 23. It will be seen that the clutch collar 49 and the rod 48 may be moved in either direction along the mandrel shaft 24 by turning the lever 51a about its pivot pin 52.

As best shown in Figs. 4 and 5, the lever 51 has a downwardly projecting and laterally bent extension 51b. Preferably associated with the extension 51b is a yielding means normally tending to turn the lever 51a in a counter-clockwise direction, as viewed in Fig. 5, to move the clutch collar 49 and the rod 48 to the left to disengage the tooth 47a of the clutch disc 47 from the ratchet face of the pulley hub 46. As shown at the lower parts of Figs. 3 and 1, this yielding means may take the form of a spiral tension spring 55 which is connected at one end to the laterally bent portion of the extension 51b, and at the other end to a pin 56 on the under side of the base plate 18. Thus it is seen that in order to engage the clutch members 46 and 47 to cause the mandrel 25 to rotate, the lever 51a must be turned from its normal position against the tension of the spring 55.

Any suitable means, electric, pneumatic or mechanical, may be employed for actuating the lever 51a to engage the clutch members. In the embodiment disclosed in this application, mechanical means have been shown for operating the clutch.

Referring to Figs. 4 and 5, the lever 51a is provided with a substantially horizontally extending arm 63 having on its outer end a shelf 62. Engaging the top side of the shelf 62 is one arm of a bell crank 60. The bell crank 60 is pivotally mounted at 61 on the back wall of the housing 23. Connected to the back wall of the housing 23 adjacent the other arm of the bell crank 60, and by means of the coupling 58, is a Bowden wire 57. The spring 55, which serves normally to maintain the clutch members disengaged, also is effective, through the arm 63 and the shelf 62, yieldingly to maintain the upwardly extending arm of the bell crank 60 in engagement with the end of the plunger 59 of the Bowden wire 57.

The other end of the Bowden wire may be provided with any suitable operating mechanism, (not shown) for example, a manually operable button on the handle of the mouthpiece of the dictating machine. Referring to Fig. 4, when the Bowden wire is actuated, the plunger 59 will be forced to the left in the usual manner, and in so moving will turn the bell crank 60 in a counter-clockwise direction to depress the outer end of the arm 63. Depression of the outer end of the arm 63 turns the lever 51a to move the clutch shifting yoke 51, thereby causing the clutch members 46 and 47 to engage in the manner hereinbefore set forth.

Thus it is seen that actuation of the Bowden wire operating mechanism effects a driving connection between the pulley 26 and the mandrel 25 to cause the mandrel to rotate with the pulley.

Referring to Fig. 1, the standard 19, near its rear edge, supports one end of a hollow carriage rod shaft 28 extending longitudinally of the machine. The other end of the shaft 28 is supported by another standard, (not shown) near the right hand end of the base plate 18. As may be seen in Figs. 2 and 4, the shaft 28 is hollow and has through its under side a longitudinally extending opening, the function of which will appear hereinafter.

Rotatably supported within the shaft 28 is a carriage feed screw 27. The feed screw 27 has a suitable driving connection, (not shown) with the mandrel shaft 24. This driving connection may conveniently take the form of a chain of gears housed within the standard 19.

Extending longitudinally of the machine, coaxial with and rotatably mounted upon the shaft 28, is a carriage rod 20. As may be seen in Figs. 2 and 4, the carriage rod 20 also has a longitudinally extending opening through its under side, and along its front side the carriage rod has a keyway 82.

Referring to the lower right hand portion of Fig. 4, extending longitudinally of the machine and spaced beneath the carriage rod 20 is a guide rod 21. The guide rod 21 is supported at one end by the standard 19 at the left hand end of the machine, and conveniently may be supported at its other end by the standard, (not shown) which supports the right hand end of the carriage rod shaft 28.

Referring to Figs. 1, 2 and 4, slidably mounted upon the carriage rod 20 is a sound-box carriage 22. As may be seen in Figs. 2 and 4, the carriage 22 is provided with a downwardly extending arm which slidably engages the guide rod 21 to prevent turning movement of the carriage 22 about the carriage rod 20.

The sound-box carriage 22 is adapted to be moved longitudinally of the machine along the carriage rod 20 and the guide rod 21 by means of the feed screw 27, which is engaged by a feed nut on the carriage. Referring to Figs. 2 to 5, the lower side of the feed screw may be engaged by a feed nut 29 extending upwardly through the longitudinally extending openings of the carriage rod 20 and the carriage rod shaft 28. As shown, the feed nut is substantially U-shaped, with the bottom of the U extending parallel to the feed screw. The upper ends of the U are concavo screw-threaded for engagement with the feed screw, and as may be seen in Figs. 2 and 4, the bottom of the U may have a raised central ridge, the function of which will appear hereinafter.

The feed nut 29 is carried on the upper end of a pin 29a which is vertically slidable in a well in the downwardly extending arm of the carriage 22. The pin 29a normally is forced upwardly, as by means of a spiral compression spring 33 within the well and engaging the bottom of the pin 29a. The spring 33 normally tends to move the feed nut 29 into engagement with the underside of the feed screw 27.

As best shown in Figs. 2 to 5, surrounding the carriage rod 20 and slidably keyed thereto by means of the keyway 82 is a collar having an upwardly projecting control lever 30 extending through an opening in the top wall of the carriage 22. The collar lies between the upright members of the U-shaped feed nut 29, and, with the carriage rod 20, has a limited range of turning movement about the shaft 28. This collar is provided on its lower edge with a cam face 32 slidably engaging the raised central ridge on the bottom of the U-shaped feed nut 29.

As may be seen in Figs. 2 and 4, when the lever 30 is moved to a vertical position as shown in Fig. 4 the cam 32 engages the bottom of the U-shaped feed nut 29 to force the feed nut away from the feed screw 27 against the pressure of the spring 33. With the mechanism in this position the operator may manually slide the carriage 22 along the carriage rod 20 to any desired position. When the lever 30 is moved in either direction from its vertical position the cam 32 permits movement of the feed nut 29 upwardly under the influence of the spring 33 into engagement with the feed screw 27. In other words, movement of the lever 30 in either direction from the vertical operatively connects the carriage 22 and the feed screw 27 so that rotation of the feed screw will move the carriage along a record 41 carried on the mandrel 25.

Pivotally connected to the control lever collar at its lower edge by means of a pin is a forwardly extending link 37. The forward end of the link 37 has a hook and slot connection 38 with a tube 36 slidably mounted in and forming part of a sound-box casing 35 which is mounted on the front portion of the carriage 22. A forwardly extending, reduced tubular portion of the sound-box casing 35 may be connected by means of any suitable flexible tube, (not shown) to a mouthpiece. Telescopically mounted within this reduced tubular portion of the sound-box casing is one end of a tapered tubular member 45 which is connected with the tube 36 so as to be moved therewith.

The inner end of the tubular member has a ball and socket connection with one end of a sound-box tube 43 which carries at its other end a sound-box 34. The tubular members 45 and 43 provide for the transmission of sound between the sound-box and the mouthpiece tube. The sound-box 34 is provided with a diaphragm carrying a recording stylus 39 and a reproducing stylus 40 to provide a combination recorder and reproducer.

With the control lever 30 in the forward or recording position, shown in full lines in Fig. 2, the link 37 is moved rearwardly of the machine to slide the tubes 36 and 43 to the rear to bring the recording stylus 39 into engagement with the record 41. In this position of the control lever the feed nut 29 is in engagement with the feed screw 27, and the machine is in condition for recording sound. The operator has merely to actuate the Bowden wire control to engage the clutch between the pulley 21 and the mandrel shaft 24, and then to speak into the mouthpiece. Engagement of the clutch causes the record mandrel to rotate, and commences the feeding of the carriage 22 along the record 41. Sound transmitted from the mouthpiece to the sound-box causes the diaphragm to vibrate, and the stylus 39 records these vibrations on the record 41.

When the control lever is moved from the recording position shown in Fig. 2 to the vertical or neutral position shown in Fig. 4, the sound-box is shifted forwardly. As this action progresses, the sound-box tube 43 is lifted by means of the engagement of a lug 42 on the lower side of the tube with a finger 44 adjustably fastened on the casing 35, the resultant camming action turning the tube 43 about its ball and socket connection to raise the sound-box and styli from the record 41. With the control lever in neutral position the record may be removed or replaced, or the carriage may be moved along the record without marring the surface of the record with the styli.

When the control lever is pushed to the rear or reproducing position the sound-box is again shifted forwardly and the lug 42 rides over the finger 44, thereby lowering the sound-box to bring the reproducing stylus 40 into engagement with the surface of the record 41. At the same time the feed nut 29 is moved into engagement with the feed screw 27, and by actuating the Bowden wire control the operator may listen to matter recorded upon the record 41.

For further details of the sound-box construction and control means reference may be had to the following patents: T. H. MacDonald, No. 1,003,625, September 19, 1911; T. H. MacDonald, No. 1,100,024, June 16, 1914; and J. J. Scully, No. 1,093,732, April 21, 1914.

Heretofore, when the operator wished to remove a record from or replace a record on the mandrel of the dictating machine it was necessary to move manually the control lever 30 to neutral position before sliding the record off of or on to the mandrel. If the control lever were not moved to the neutral position to raise both styli from record-engaging position, the stylus which was in lowered position would cut a groove longitudinally of the record, thereby impairing subsequent reproduction of matter recorded on the record. Furthermore, if a record were placed on the mandrel with either stylus in lowered position there was danger of damaging the stylus or the sound-box.

According to this invention, means are provided, associated with the record ejector, automatically to raise both styli from record-engaging position when the record ejector is operated, the styli being moved out of engagement with the record prior to movement of the record relative to the mandrel. Further means are provided normally to render the usual stylus control lever inoperative and to maintain the styli in raised position until a record has again been placed on the mandrel.

Referring to the lower right hand corner of Fig. 1, and also to Fig. 2, a thumb-piece 65 for actuating the record-ejecting mechanism projects upwardly through an arcuate slot in a plate 66 covering an opening in the base plate 18. The thumb-piece 65 preferably is located near the front of the machine, and adjacent the end of the mandrel 25, so that the record ejector may be actuated and the record grasped by a single movement of one hand on the part of the operator.

Below the base plate 18 the thumb-piece 65 is connected to one end of a lever 64 which is pivotally mounted on the underside and near the rear of the base plate, as by means of a screw 67. Intermediate its ends, the lever 64 is slidably and pivotally connected by means of a screw and slot connection 69 to one end of a sliding link 68. The link 68 is suspended from the underside of the top plate 18 by means of a screw 68a passing through a longitudinal slot in the link and engaging a screw-threaded opening in the base plate. It will be seen that movement of the thumb-piece 65 to the right or left effects a corresponding movement of the link 68.

As may best be seen in Figs. 6, 4 and 1, the link 68 is provided near its left hand end with two forwardly projecting extensions or shelves 97 and 100, the function of which will appear hereinafter.

Referring particularly to Figs. 4 and 3, secured to the left hand end of the link 68 is an upwardly projecting arm 70 which has a rearwardly offset extension 70a projecting upwardly through a slot in the casing 23 to a point adjacent and in front of the carriage rod 20.

Referring to Fig. 3, the upper end of the arm 70 is provided with a bearing hub slidably engaging a plunger rod 73. The left hand end of the plunger rod 73 is slidably supported in the standard 19. When in its extreme left hand position, the plunger rod may project between the hub and rim of the pulley 26, but in this case the flange or spokes of the pulley are offset so as not to interfere with the rotation of the pulley. The right hand portion of the plunger rod 73 is provided with an enlarged shoulder 74 which is slidably supported in the side wall of the housing 23. Surrounding the shoulder 74 of the plunger rod, and engaging the inner wall of the housing 23 and a pin passing through the plunger rod is a spiral compression spring 83. The spring 83 normally tends to force the plunger rod 73 to the left, as viewed in Fig. 3. This movement of the plunger rod under the influence of spring 83 is limited by engagement of an enlarged ejector head 74a on the outer or right hand end of the shoulder 74 with the outer wall of the housing 23.

As may best be seen in Fig. 2, the head 74a may be generally crescent shaped. The plunger rod 73 is so positioned relative to the mandrel 25 that when the plunger is moved to the right against the pressure of the spring 83 the head 74a will engage a portion of the adjacent end of the record to force the record to the right along the mandrel 25 a distance sufficient to free the record on the mandrel.

Preferably, means are provided for normally maintaining the arm 70 and associated mechanism in its farthest left position, as shown in Fig. 3. Conveniently this means may take the form of a toggle spring arrangement adapted to move and yieldingly maintain the arm 70 in either of its extreme positions.

The toggle spring arrangement is best shown in Figs. 4 and 5. The arm 70 is provided, for example on its rear side, with a stud which is engaged by the forked end of a plunger stem 71. The plunger stem 71 is slidable in a member 71a pivotally mounted on the base plate 18. Surrounding the plunger stem 71, between its forked end and the member 71a, is a spiral compression spring 76. The spring 76 forces the forked end of the stem 71 against the stud on the arm 70.

Except when this stud is centered directly over the member 71a, the force exerted by the spring 76 has a horizontal component tending to move the arm 70 either to the left or right, depending upon whether the arm 70 is to the left or right of the member 71a.

By referring to Fig. 1 it will be seen that the plunger rod may be moved to eject a record from the mandrel by moving the thumb-piece 65 from the normal position shown at the left hand end of its travel, to the opposite extremity of its travel. Movement of the thumb-piece to the right causes the arm 70 also to move to the right through the linkage connection 64 and 68. After the arm 70 has been moved to the right against the force of the toggle spring 76 a distance sufficient to carry the arm 70 past the toggle center, the toggle spring 76 becomes effective to urge the arm 70 toward its extreme right hand position, aiding in thrusting the plunger rod to the right against the pressure of the spring 83, to force the record off the mandrel, as shown in Fig. 5.

The spring 76 maintains the record-ejecting mechanism in actuated position until the arm 70 is subsequently moved to the left past the toggle center. Conveniently the record-ejecting mechanism may be returned from its actuated position to its normal unoperated position merely by positioning a record on the mandrel 25. As the record is pushed to the left into position, the end of the record engages the head 74a of the plunger rod 73 and forces the plunger rod and the arm 70 to the left. When the record reaches its normal operating position the arm 70 will have been forced to the left either past the toggle center, whereupon the toggle spring 76 carries the arm 70 and its associated apparatus to its extreme left hand position, or to a point where the force exerted by the spring 83 overcomes the force exerted by the spring 76 so that the spring 83 carries the arm 70 past the toggle center to permit the spring 76 to carry the arm 70 to its extreme left hand position. After the force exerted by the toggle spring 76 reverses, from right to left, the spring 83 continues to force the plunger rod 73 to the left to its extreme left hand position to withdraw the head 74a from contact with the record end.

Thus it is seen that when the record-ejecting mechanism is operated to remove a record from the mandrel, the ejecting mechanism remains in actuated position, either until another record is positioned on the mandrel, or until the thumb-piece 65 is manually moved to the left to reset the ejecting mechanism. The object in having the ejecting mechanism remain in actuated position will appear hereinafter.

Assuming that a stylus is in record engaging position, the ability of the member 70 to move to the right a limited distance relative to the rod 73 without actuating the latter permits an arrangement whereby the stylus may be automatically lifted from its record-engaging position before the record is ejected from the mandrel. This lifting of the stylus may be accomplished without any further effort than movement of the ejector thumb-piece 65 to the right.

Conveniently, this operative connection between the thumb-piece 65 and the stylus control means may be completed through the medium of the extension 70a of the arm 70, both previously referred to.

Referring to Figs. 1, 6, 3 and 5, it will be seen that the upper end of the extension 70a is provided with a horizontally extending guide member 72 slidably engaging an opening in the standard 19. The upper end of the extension 70a also is provided with a rearwardly extending ball stud 75.

Movement of the stud 75 longitudinally of the machine, as by means of the thumb-piece 65 and the inter-connecting linkage previously described, or by the positioning of a record on the mandrel, is utilized in the manner hereinafter set forth to turn the carriage rod 20 about its shaft 28. Since the carriage rod is slidably keyed to the stylus control lever, it follows that movement of the arm 70 and the extension 70a longitudinally of the machine may be made effective to turn the stylus control lever.

As may best be seen in Figs. 1, 3, 5 and 6, the left hand end of the carriage rod 20 is provided with two collars 78 and 79 which are fixed thereon against rotation as well as against sliding movement, as by means of set screws. The collars 78 and 79 are provided on their forward edges with the slots or grooves 78a and 79a respectively. The collars are arranged so that these slots are engaged by the ball stud 75 mounted on the upper end of the extension arm 70a.

By suitably designing the slots in the collars 78 and 79, and by suitably rotatably positioning the collars relative to each other it is possible to effect any desired control of the styli by movement of the ball stud 75 longitudinally of the machine.

Figs. 7 to 10 inclusive show one suitable arrangement. The collar 78 is provided with an extended horizontal slot 78a having the lower left hand edge downwardly inclined. The collar 79 is provided with an inclined slot 79a extending from upper left to lower right.

When the control lever 30 is in neutral position, the parts are as shown in Fig. 7, with the stud 75 just engaging the slot 79a. If the stud 75 is moved to the left, in the direction indicated by the horizontal arrow, the camming action engagement with the slot 79a turns the collar 79, carriage rod 20 and control lever 30 in the direction indicated by the vertical arrow to the forward or recording position shown in Fig. 8. Thus it will be seen that the act of placing a record on the mandrel, with the resultant movement of the arm 70 to the left, will automatically shift the sound-box into recording position.

If it is desired to change from recording to neutral position the control lever 30 is manually moved to vertical or neutral position, the collar 79 turning in the direction of the vertical arrow in Fig. 9. The resultant camming action on the stud 75 forces the stud 75 to the right to the position shown in Fig. 9.

Upon further manual turning movement of the lever 30 to the rear or reproducing position the stud 75 is cammed to the right to the position shown in Fig. 10.

If with the mechanism in neutral position as shown in Fig. 7, the stud 75 is moved to the right, as during the record-ejecting operation, the stud slides along in the slot 78a. If the stud is moved to the right when the mechanism is in recording position, as shown in Fig. 8, the stud first cams the mechanism into neutral position and then slides along in the slot 78a. Similarly, if the stud is moved to the right when the mechanism is in reproducing position, as shown in Fig. 10, the stud first cams the mechanism into neutral position and then slides along in the slot 78a.

When the record-ejecting mechanism is actuated in the manner hereinbefore set forth, the stud 75 is moved to the right end of the slot 78a, as shown in Fig. 5, and is maintained in this position by means of the toggle mechanism shown at the bottom of Fig. 5, and previously referred to. It will be obvious that under these conditions the engagement of the stud 75 and the slot 78a locks the carriage rod 20 against turning movement, and prevents manipulation of the control lever 30 to lower either stylus into record-engaging position while the record-ejecting mechanism is in actuated condition.

In this embodiment, preferably the toggle spring 76 is not sufficiently strong to force the stud 75 to the left from either of the positions shown in Figs. 9 and 10 to put the mechanism in recording position. However, the momentum attained by the members 70, 70a, 75, 72, etc. due to the snap action of the toggle mechanism when a record is positioned on the record, forcing the plunger rod 73 to the left, is sufficient to carry the stud 75 to the extreme left position to cam the mechanism into recording condition.

Thus it will be seen that means are provided operatively connected with the record-ejecting mechanism automatically to raise either stylus which may be in engagement with the record before the record is moved relative to the mandrel. The ejecting mechanism remains in actuated position until another record is positioned on the mandrel, or until manually reset. While the ejecting mechanism is in actuated position, the manual stylus control lever is locked against movement to lower either stylus into record-engaging position. Positioning a record on the mandrel resets the ejecting mechanism, and moves the recording stylus into engagement with the record. With this arrangement a record may be removed from the mandrel and another record placed on the mandrel without marring the record surface with the styli, and without regard by the operator to the condition of the styli and sound-box at the time.

Preferably, means are provided for locking the Bowden wire against operation under certain conditions, to warn the operator that the machine is not in operative condition. This end may be attained, as may be seen by reference to the lower portions of Figs. 3, 4, 5, 11, 12 and 13, by providing the arm 63, which is integrally connected with the clutch shifting yoke, with a downwardly projecting extension 96. When a record is on the mandrel, and the stylus control is in recording position, as is shown in Fig. 3, the Bowden wire may be operated to engage the clutch between the pulley 26 and the mandrel shaft 24 in the usual manner. However, when the stylus control is moved to neutral position by manual adjustment of the control lever 30, the collar 79 acts to move the sliding link 68 to the right, in the manner hereinbefore described, a distance sufficient to bring the shelf 100 below the extension 96 so as to prevent operation of the Bowden wire. When the stylus control is moved to reproducing position, as by manual adjustment of the control lever 30, the sliding link 68 is moved further to the right, so as to again permit operation of the Bowden wire, the extension 96 being free to move downwardly in the opening between the shelves 97 and 100. When the record-ejecting mechanism is in actuated position, as in Fig. 5, the sliding link 68 has been moved to the right to bring the shelf 97 below the extension 96 to prevent operation of the Bowden wire. With this arrangement the Bowden wire is locked against operation when the stylus control is in neutral position, or when the record ejector is operated, thereby clearly indicating to the operator that the machine is not in condition for operation.

Since the arrangement disclosed in Figs. 1 to 10 provides for automatically lowering the recording stylus on the record when a record is replaced on the mandrel, it is desirable to have means for automatically returning the sound-box to the left hand or initial end of the machine when the record-ejecting mechanism is operated.

Referring to upper left hand corner of Fig. 1, a spring drum 86 is rotatably mounted by means of a screw 88 on an offset arm 87 of the standard 19. Enclosed within the drum 86 is a flat spiral spring (not shown) connected at one end to the arm 87 and at the other end to the drum 86. The spiral spring tends to turn the drum in a counter-clockwise direction, as viewed in Figs. 3 and 5.

Fastened to the drum 86 is a pulley wheel 90, to which is affixed one end of a tape 91. The tape is longer than the distance traveled by the stylus in moving along the record, and the other end of the tape is fastened to a pin 92 carried on the back side of the sound-box carriage. It will be seen that the arrangement of the spring drum 86, pulley 90 and tape 91 normally tends to move the stylus carriage to the left end of the machine.

As may be seen in Figs. 3 and 6 the annular rim of the pulley 90 has on its inner peripheral edge a ratchet tooth arrangement 89 which is engaged, as may be seen in Figs. 1 and 6, by one end of a lever 93 which is pivotally mounted intermediate its ends on a screw 94 engaging the arm 87.

The lever 93 is yieldingly held in engagement with the ratchet wheel 89 by means of a spring 95 so as to prevent movement of the stylus carriage to the left under the influence of the spring drum 86 when the carriage feed nut is disengaged from the feed screw. This arrangement permits the operator to manually move the stylus control lever 30 to neutral position, and to slide the carriage along the machine independently of the means for returning the carriage to the left hand end of the machine.

As may be seen in Figs. 1, 2 and 6, during the record-ejecting operation the extension arm 70a, in moving to the right, engages the free end of the lever 93 to turn the lever against the pressure of the spring 95 and release the ratchet wheel 89, pulley 90 and spring drum 86. Since the record-ejecting operation has already shifted the stylus control to neutral position, thereby disengaging the carriage feed nut from the feed screw, the carriage will be returned by means of the spring drum 86 and the tape 91 to the left hand end of the machine. Then when a record is positioned on the mandrel and the recording stylus is automatically lowered into engagement with the record, the stylus will be at the left hand end of the record, and the machine will be in condition for recording sound.

It often happens that a record upon which sound has been recorded is replaced on the machine to listen to the recorded matter. In such a case it is not desirable to lower automatically the recording stylus onto the record when the record is placed on the mandrel.

Figs. 11, 12 and 13 disclose a modification of the slotted collars 78 and 79 for controlling the position of the stylus during and after the record-ejecting operation to leave the stylus control lever in neutral position after a record has been positioned on the mandrel. The two collars 78 and 79 have been replaced by a single collar 80, having a slot generally similar to the slots 78a and 79a. In this modification, however, the lower left hand edge of the slot is provided at 80a with a vertical portion which is engaged by the stud 75 in its movement to the left under the influence of the toggle spring arrangement. The portion 80a is effective to prevent turning of the stylus control means by the stud 75 in its movement to the left, and the stylus control remains in neutral position. This arrangement does not prevent manual manipulation of the control lever 30 to move the stylus to recording position.

It will be obvious that this same result may be accomplished in the first described modification by rotatably shifting the collars 78 and 79 relative to each other on the carriage rod 20.

Also it will be obvious that other variations in the control of the styli during the record-ejecting operation may be attained by properly designing the slots in the collar or collars carried on the left hand end of the carriage rod.

The invention may be variously modified and embodied within the scope of the subjoined claims.

I claim:

1. The combination in a phonograph of a record mandrel, record-ejecting means associated with said mandrel, means for operating said record-ejecting means, a recording stylus, a reproducing stylus, control means for alternatively shifting either of said styli into record-engaging position or shifting both of said styli out of record-engaging position, and means associated with said operating means for said record-ejecting means to move said control means to a position in which both styli are out of record-engaging position.

2. The combination in a phonograph of a record mandrel, record-ejecting means associated with said mandrel, a recording stylus, a reproducing stylus, control means for said styli having recording, reproducing and neutral positions, and means rendered effective by an operation of said record-ejecting means to move said control means to neutral position.

3. The combination in a phonograph of a record mandrel, record-ejecting means associated with said mandrel, a recording stylus, a reproducing stylus, control means for alternatively shifting either of said styli into record-engaging position or shifting both of said styli out of record-engaging position, and means rendered effective by an operation of said record-ejecting means to move said control means to a position in which one of the styli is in record-engaging position.

4. The combination in a phonograph of a record mandrel, record-ejecting means associated with said mandrel, a recording stylus, a reproducing stylus, control means for alternatively shifting either of said styli into record-engaging position or shifting both of said styli out of record-engaging position, and means rendered effective by an operation of said record-ejecting means to move said control means to a position in which the recording stylus is in record-engaging position.

5. The combination in a phonograph of a record mandrel, record-ejecting means associated with said mandrel, a carriage movable along said mandrel, a record-engaging stylus on said carriage, means normally tending to move said carriage to its initial position, control means for rendering said carriage-moving means ineffective to move said carriage, means associated with said record-ejecting means to move the stylus out of record-engaging position, and means associated with said record-ejecting means to release said control means to permit the carriage to be moved to its initial position.

6. The combination in a phonograph of a record mandrel, record-ejecting means associated with said mandrel, a carriage movable along said mandrel, means normally tending to move said carriage to its initial position, control means for rendering said carriage-moving means ineffective to move said carriage, and means associated with said record-ejecting means to release said control means to permit the carriage to be moved to its initial position.

7. In a phonograph, in combination, a support for a record-cylinder, a record-engaging stylus movable to a position in engagement with said cylinder or to a position out of engagement with said cylinder, record-ejecting means for moving a record-cylinder endwise to release it from said support, means associated with said record-ejecting means for moving the stylus out of record-engaging position upon actuation of said record-ejecting means and operative prior to the releasing of a record from said support, and means for maintaining said record-ejecting means in operated position until a manual operation restores said record-ejecting means to non-operated position, whereby said stylus is maintained out of record-engaging position.

8. The combination in a phonograph of a record mandrel, a record-engaging stylus, record-ejecting means associated with said mandrel, means associated with said record-ejecting means for moving said stylus out of record-engaging position prior to the ejection of a record, and for preventing movement of said stylus into record-engaging position until the record-ejecting means is returned by hand to non-operated position.

9. The combination in a phonograph of a record mandrel, record-ejecting means associated with said mandrel, driving means for said mandrel, a clutch connecting said driving means and said mandrel, control means for operating said clutch to operatively connect and disconnect the driving means and the mandrel, and means for rendering said control means inoperative to operate the clutch to connect the driving means and the mandrel when the record-ejecting means is in operated position.

10. The combination in a phonograph of a record mandrel, record-ejecting means associated with said mandrel, driving means for said mandrel, a clutch connecting said driving means and said mandrel, control means for operating said clutch to operatively connect and disconnect the driving means and the mandrel, and means for locking said control means against operation when the record-ejecting means is operated.

11. The combination in a phonograph of a record mandrel, record-ejecting means, a record-engaging stylus, means for moving said stylus out of record-engaging position when said record-ejecting means is actuated to eject a record from said mandrel, driving means for said mandrel, a clutch connecting said driving means and said mandrel, control means for engaging and disengaging said clutch, and means associated with said record-ejecting means for rendering said control means ineffective to operate said clutch when the record-ejecting means has moved the stylus out of record-engaging position.

12. The combination in a phonograph of a record mandrel, record-ejecting means, a record-engaging stylus, manually operable means for moving said stylus out of record-engaging position, means associated with said record-ejecting means for actuating said manual means when the record-ejecting means is operated, driving means for said mandrel, control means for rendering said driving means effective to rotate said mandrel, and means on said ejector associated means adapted to render said control means inoperative when said stylus-moving means has been moved either directly by hand or by operation of said record-ejecting means.

13. The combination in a phonograph of a record mandrel, a record-engaging stylus, record-ejecting means associated with said mandrel, means for locking said stylus out of record-engaging position when said record-ejecting means is in operated position, and means for releasing said locking means when said ejecting means is returned to unoperated position by moving a record to its seat upon said mandrel.

14. The combination in a phonograph of a record mandrel, record-ejecting means associated with said mandrel, a carriage movable along said mandrel, a record-engaging stylus on said carriage, means normally tending to move said carriage to its initial position, control means for rendering said carriage-moving means ineffective to move said carriage, means associated with said record-ejecting means to move the stylus out of record-engaging position, means associated with said record-ejecting means to release said control means to permit the carriage to be moved to its initial position, and means for moving said stylus to record-engaging position when a record is positioned on the mandrel.

15. The combination in a phonograph of a record mandrel, a record-engaging stylus, control means for moving said stylus into and out of record-engaging position, and means rendered effective for operating said control means to move said stylus into record-engaging position by the movement of a record to its seat upon said mandrel.

16. The combination in a phonograph of a record mandrel, a recording stylus, a reproducing stylus, control means for alternatively shifting either of said styli into record-engaging position or shifting both of said styli out of record-engaging position, and means responsive to movement of a record into operative position upon said mandrel for automatically moving a stylus into record-engaging position.

17. The combination in a phonograph of a record mandrel, a record-engaging stylus, record-ejecting means associated with said mandrel, means for locking said stylus out of record-engaging position when said record-ejecting means is in operated position, means for retaining said record-ejecting means in operated position, and means for automatically releasing said locking means when said record-ejecting means is moved to non-operated position.

18. The combination in a phonograph of a record mandrel, a record-engaging stylus, record-ejecting means associated with said mandrel, means for locking said stylus out of record-engaging position when said record-ejecting means is in operated position, means for resiliently retaining said record-ejecting means in operated position, and means for automatically releasing said locking means and moving said stylus into record-engaging position when said record-ejecting means is moved to non-operated position.

19. The combination in a phonograph of a record mandrel, record-ejecting means associated with said mandrel, a stylus, control means for alternatively shifting said stylus into or out of record-engaging position, means associated with said record-ejecting means to operate said control means to move and lock the stylus out of record-engaging position when said record-ejecting means is operated, the arrangement being such that the locking means is automatically released when the record-ejecting means is moved to non-operated position, and means for retaining said record-ejecting means in operated position until moved by a manual operation to non-operated position.

20. The combination in a phonograph of a record mandrel, record-ejecting means associated with said mandrel, a stylus, control means for alternatively shifting said stylus into, or out of record-engaging position, means associated with said record-ejecting means to operate said control means to move and lock the stylus out of record-engaging position when said record-ejecting means is operated, the arrangement being such that the locking means is automatically released when the record-ejecting means is moved to non-operated position, means for moving said control means to move said stylus into record-engaging position when said record-ejecting means is moved to non-operated position, and resilient means for retaining said record-ejecting means in operated position until moved by a manual operation to non-operated position.

21. The combination in a phonograph of a record mandrel for cylindrical record tablets, record-ejecting means movable longitudinally of said mandrel to eject a record-cylinder therefrom, a stylus-carrying sound-box movable transversely and vertically with respect to said mandrel to condition said stylus operatively or inoperatively with respect to a record-cylinder on said mandrel, and means associated with said record-ejecting means adapted to impart both said motions to said sound-box when said record-ejecting means is put in operation.

22. The combination in a phonograph of a record mandrel for cylindrical record tablets, record-ejecting means movable longitudinally of said mandrel to eject a record-cylinder therefrom, a stylus-carrying sound-box movable transversely and vertically with respect to said mandrel to condition said stylus operatively or inoperatively with respect to a record-cylinder on said mandrel, and means associated with said record-ejecting means adapted to impart said movements to said sound-box to condition said stylus inoperatively when said record-ejecting means is actuated to remove a record-cylinder from said mandrel.

23. The combination in a phonograph of a record mandrel for cylindrical record tablets, record-ejecting means movable longitudinally of said mandrel to eject a record-cylinder therefrom, a stylus-carrying sound-box movable transversely and vertically with respect to said mandrel to condition said stylus operatively or inoperatively with respect to a record-cylinder on said mandrel, and means associated with said record-ejecting means adapted to impart said movements to said sound-box to condition said stylus operatively when said record-ejecting means is restored to its original position by placing a record-cylinder on said mandrel.

24. In a phonograph, in combination, a record-support, a recording stylus, a start-and-stop device for said phonograph adapted to be locked in stop position, and means responsive to the act of seating a record-cylinder upon said record-support for bringing said stylus into operative relation with said record-support and simultaneously releasing said start-and-stop device.

25. The combination in a phonograph of a record-propelling member, means for removing a record from operative relationship to said propelling member, recording means, reproducing means, control means for said recording and reproducing means having recording and reproducing positions, and means rendered effective by an operation of said record-removing means to move said control means from reproducing to recording position.

26. The combination in a phonograph of a record support, a record-ejecting means associated with said support, a start-and-stop device, and means associated with said record-ejecting means rendered operative to prevent operation of said start-and-stop device when the record-ejecting means is operated to remove a record from said support.

27. The combination in a phonograph of a movable record support, record-ejecting means, a record-engaging stylus, means for moving said stylus out of record-engaging position when said record-ejecting means is actuated to eject a record from said support, a starting device for controlling the operation of said record support, and means associated with said record-ejecting means for rendering said starting device ineffective when the record-ejecting means has moved the stylus out of record-engaging position.

28. In apparatus of the character described, in combination, a record-propelling member, a recording device, a start-and-stop device for said record-propelling member adapted to be locked in stop position, and means for rendering said recording device operative and simultaneously releasing said start-and-stop device in response to the act of operatively associating a record with said record-propelling member.

WILLIAM F. FEYRER.